United States Patent
Bates et al.

(10) Patent No.: US 8,225,143 B2
(45) Date of Patent: Jul. 17, 2012

(54) METHOD AND APPARATUS TO INJECT NOISE IN A NETWORK SYSTEM

(75) Inventors: Allen Keith Bates, Tucson, AZ (US); Nils Haustein, Soergenloch (DE); Craig Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1207 days.

(21) Appl. No.: 12/021,026

(22) Filed: Jan. 28, 2008

(65) Prior Publication Data
US 2009/0190674 A1     Jul. 30, 2009

(51) Int. Cl.
*G06F 11/00* (2006.01)
(52) U.S. Cl. ............................ 714/41; 714/43
(58) Field of Classification Search ............... 714/41, 714/43
See application file for complete search history.

(56) References Cited

U.S. PATENT DOCUMENTS

| | | | | |
|---|---|---|---|---|
| 5,155,440 A * | 10/1992 | Huang | ........................ | 324/539 |
| 5,255,267 A | 10/1993 | Hansen et al. | | |
| 5,862,145 A | 1/1999 | Grossman et al. | | |
| 6,201,853 B1 * | 3/2001 | Butler et al. | ..................... | 379/21 |
| 6,640,272 B1 | 10/2003 | Hartwell et al. | | |
| 2002/0149812 A1 * | 10/2002 | Hong et al. | ..................... | 359/110 |
| 2002/0194547 A1 | 12/2002 | Christensen et al. | | |
| 2003/0103623 A1 * | 6/2003 | Kim | ........................ | 379/387.01 |
| 2003/0135681 A1 * | 7/2003 | Laity et al. | ..................... | 710/303 |
| 2003/0235090 A1 * | 12/2003 | Lee et al. | ........................ | 365/200 |
| 2004/0028144 A1 * | 2/2004 | Golo | ............................... | 375/257 |
| 2004/0041029 A1 * | 3/2004 | Postman et al. | ............. | 235/462.3 |
| 2004/0083067 A1 * | 4/2004 | Bisset | ............................... | 702/75 |
| 2005/0036277 A1 * | 2/2005 | Kessler et al. | ................ | 361/600 |
| 2005/0169186 A1 * | 8/2005 | Qiu et al. | ........................ | 370/242 |
| 2005/0204243 A1 * | 9/2005 | Hu et al. | .......................... | 714/742 |
| 2006/0182014 A1 | 8/2006 | Lusky et al. | | |
| 2006/0209968 A1 * | 9/2006 | Eyres | ............................... | 375/257 |
| 2006/0233228 A1 * | 10/2006 | Liang | ............................... | 375/222 |
| 2007/0005332 A1 * | 1/2007 | Armstead et al. | ............... | 703/23 |
| 2007/0089006 A1 * | 4/2007 | Zimmerman | ................ | 714/738 |
| 2007/0162620 A1 * | 7/2007 | Terry et al. | ..................... | 709/253 |
| 2008/0055067 A1 * | 3/2008 | Curt et al. | ................ | 340/538.12 |
| 2008/0074992 A1 * | 3/2008 | Sams et al. | ..................... | 370/216 |
| 2008/0084218 A1 * | 4/2008 | Hailey et al. | .................... | 324/627 |
| 2008/0133489 A1 * | 6/2008 | Armstead et al. | ................ | 707/3 |
| 2008/0170509 A1 * | 7/2008 | Diab et al. | ..................... | 370/252 |
| 2008/0198910 A1 * | 8/2008 | Tidestav | ......................... | 375/226 |
| 2008/0221853 A1 * | 9/2008 | Armstead et al. | ............... | 703/16 |
| 2008/0274646 A1 * | 11/2008 | Schoop et al. | ............ | 439/620.23 |
| 2009/0108911 A1 * | 4/2009 | Nakahara et al. | ............. | 327/434 |
| 2009/0183229 A1 * | 7/2009 | Ohnishi | ............................ | 726/2 |

FOREIGN PATENT DOCUMENTS
WO   WO9811692 A1   3/1998
* cited by examiner

*Primary Examiner* — Scott Baderman
*Assistant Examiner* — Chae Ko
(74) *Attorney, Agent, or Firm* — Kurt P. Goudy; Khanh Q. Tran

(57) ABSTRACT

An apparatus, system, and method are disclosed for injecting noise onto a link of a network. The apparatus, system, and method include, providing a noise injector card, connecting the noise injector card to the link, receiving a control signal to activate the noise injector card, switching a switch of the noise injector card, and injecting noise onto the link.

22 Claims, 4 Drawing Sheets

METHOD AND APPARATUS TO INJECT NOISE IN A NETWORK SYSTEM

BACKGROUND OF THE INVENTION

1. Field of the Invention

The disclosure relates to a method, system, and apparatus for performing diagnostic operations in a computerized network system.

2. Description of the Related Art

Data storage system users may require a high degree of reliability and quick recovery from failures. Some data storage system users may require protection from data loss due to natural disasters or equipment failures. For example, data storage system users such as financial institutions, retailers, and the like may demand a high degree of reliability for financial transactions, inventory control, etc. An enterprises storage system ("ESS"), such as the TotalStorage® Enterprise Storage Server® from IBM®, may be used by financial institutions and others businesses to store data where reliability is important. Such systems may be configured as a network.

For example, an Ethernet network may be used in a data storage system to couple a plurality of data storage devices. The Ethernet network may be configured as a storage area network ("SAN"). The SAN may include communication links such as Ethernet cables, wires, switches, and connectors. Sometimes a marginal Ethernet connection may occur in the data storage system. When this happens the information stream may be disrupted causing loss of data. For some data storage system users, such as a financial institution or health care provider, any loss of data may be critical. Thus, being able to test the integrity and reliability of data storage systems is beneficial.

SUMMARY OF THE INVENTION

The present invention is developed in response to the present state of the art, and in particular, in response to the problems and needs in the art that have not yet been fully solved by currently available methods, systems, and apparatuses. Accordingly, the present invention is developed to provide a reliable and cost effective apparatus, system, and method to perform diagnostics on a data storage system while the system is intact and active.

The present invention provides a method, system, and apparatus to inject noise in a communication link of a network. Additionally, the present invention provides a reliable and cost effective apparatus, system, and method to perform fault simulation on a data storage system while the system is intact and active. The present invention further provides a cost effective manner to inject noise into a cable such that the system is still intact, i.e., the cable is not pulled, but the information stream is disrupted. Thus, the present invention allows testing and verifying that a subsystem can detect, isolate, and handle noise.

In one embodiment, an apparatus of the present invention is presented for injecting noise onto a cable or link of a network. The apparatus includes at least two jacks; a plurality of signal wires connecting the two jacks together; a switch connected to the two jacks by at least one of the plurality of signal wires; a parallel port connected to the switch via a control signal wire; and a power connector connected to the switch.

In one embodiment, an apparatus of the present invention is presented for injecting noise onto a cable or link of a network. The apparatus includes at least two ports; a plurality of signal wires connecting the two ports together; and a plurality of switches connected to the two ports by the plurality of signal wires.

In one embodiment, a method of the present invention is presented for injecting noise onto a cable or link of a network. The method includes proving an Ethernet network having an Ethernet infrastructure; embedding a noise injector card in the Ethernet infrastructure; entering a license key into the Ethernet infrastructure; activating the embedded noise injector card; and injecting noise onto an Ethernet link.

In one embodiment, a method of the present invention is presented for injecting noise onto a cable or link of a network. The method includes, providing a noise injector card, connecting the noise injector card to the link, receiving a control signal to activate the noise injector card, switching a switch of the noise injector card, and injecting noise onto the link.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
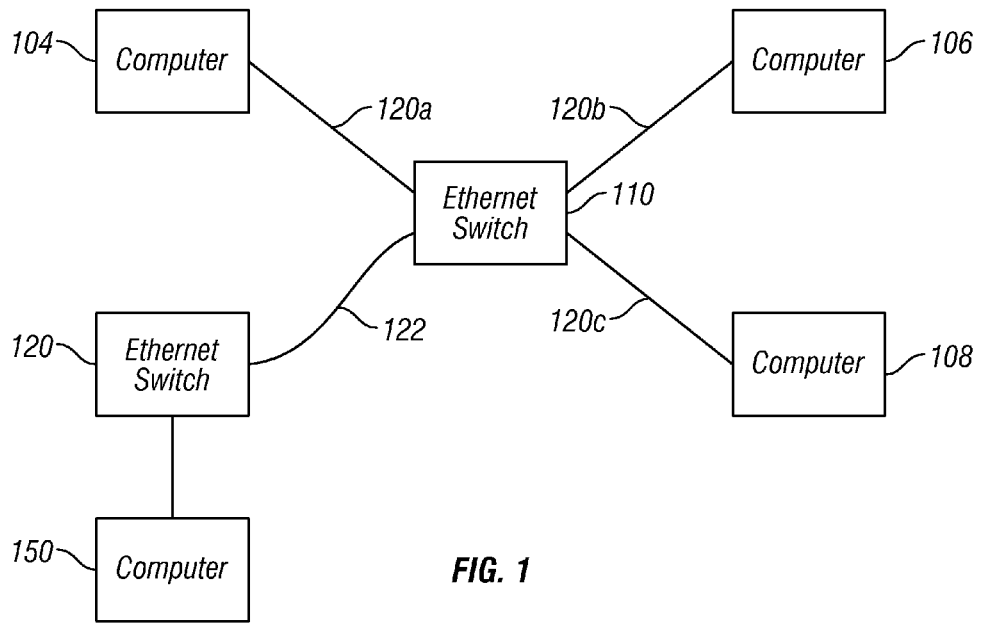
FIG. 1 is a schematic block diagram illustrating a computerized network environment, which may implement the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Referring to FIG. 1, an exemplary computerized network system 100 also referred to as an Ethernet network system is depicted. The network system 100 may be configured as a Local Area Network (LAN), a Storage Area Network ("SAN"), Wide Area Network (WAN), the Internet, and Intranet etc. The network system 100 may include a plurality of computing devices 104, 106, and 108, such as computers, servers, storage devices, subsystems, etc., like IBM data storage devices.

The computing devices 104, 106, and 108 communicate with each other via communication lines or cables 102a, 120b, 120c, respectively. The network system 100 also includes at least one hub and/or switch 110 to facilitate the management and/or direction of data flow between computing devices 104, 106, 108.

As illustrated in FIG. 1, switch 110 is coupled to switch 120 via crossover cable 122. Switch 120 may also be attached to other devices 150, such as edge devices, depending on the size of the network system 100. The edge devices 150 may be other computing devices, such as computers, servers, storage devices, etc. Switch 110 is also coupled to computing devices 104, 106, 108 via cables 120a, 120b, and 120c, respectively. The switch 110 may direct or steer data flow, such as information packets like Ethernet packets, between the attached computing devices 104, 106, 108. Switch 120 may also direct data flow, such as Ethernet packets, to other devices or switches attached to network system 100.

Figure 2:
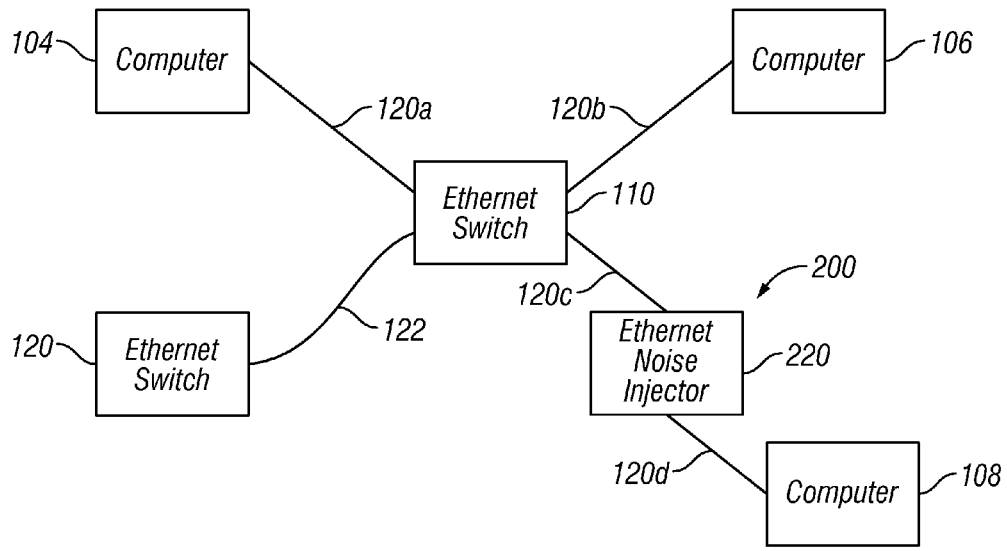
FIG. 2 is a schematic block diagram illustrating an embodiment to inject noise in a computerized network in accordance with the present invention.

FIG. 2 depicts an exemplary embodiment to inject noise in a computerized system in accordance with the present invention. The exemplary embodiment may be configured as apparatus 200. Apparatus 200 may be implemented, for example, in network system 100 as illustrated in FIG. 1. Accordingly, description of the apparatus 200 refers to elements of FIG. 1, like numbers referring to like elements.

In one embodiment, apparatus 200 is deployed as part of a system test of a SAN system 100. As such, the apparatus 200 injects noise onto the SAN system 100 to simulate and verify the system impact of having a marginal cable. For example, apparatus 200 may simulate a faulty cable in an RJ-45 Ethernet based network, such that noise is injected by apparatus 200 onto one of the interface cables that connects two subsystems within the system. In this configuration, apparatus 200 allows testing and verifying that the storage subsystem is operable to detect, isolate, and handle disruptions in the information stream. Thus, maintaining the integrity of data being communicated between storage subsystems, such as storage subsystems 104, 106, 106. In one embodiment, storage subsystems 104, 106, 106 comprise an enterprises storage system ("ESS"), such as the TotalStorage® Enterprise Storage Server® from IBM®,).

As illustrated in FIG. 2, apparatus 200 comprises an Ethernet noise injector 220. The Ethernet noise injector 220 may be inserted into an Ethernet network system, such as the network system 100. The Ethernet noise injector 220 is coupled to Ethernet switch 110 and computing device 108 via Ethernet cables 120c, 120d, respectively. Likewise, Ethernet noise injector 220 may be coupled to Ethernet cables 120a, and/or 120b, such that Ethernet traffic traveling between switch 110 and computing devices 104, 106, travel through Ethernet noise injector 220. Similarly, Ethernet noise injector 220 may be coupled to Ethernet cable 122, such that Ethernet traffic traveling between switches 110, 120 travel through Ethernet noise injector 220. Accordingly, the Ethernet noise injector 220 may be coupled to Ethernet network 100 as needed to test any one portion and/or the whole system.

For example, Ethernet noise injector 220 is configured such that in operation, the network traffic and/or information packets (e.g., Ethernet packages) traveling between Ethernet switch 110 and computing device 108 also travel through Ethernet noise injector 220. The Ethernet noise injector 220 acts as a pass through device. As such, noise is injected by Ethernet noise injector 220 onto any one of the interface cables 120a, 120b, 120c, that connects two subsystems (e.g., devices 104, 106, 108) while the network system 100 is active and operational. By injecting noise, apparatus 200 disrupts the information stream in the network without the need to pull an Ethernet cable. The disruption of the information stream by apparatus 200 simulates a marginal cable or a pulling of a cable within the network during a systems test. This allows verification that the subsystems are operating properly to detect, isolate, and handle the noise.

In certain embodiments, apparatus 200 is deploy as part of a system test to simulate the pulling of a cable to verify the system can handle inadvertent and intentional re-cabling while the system is active. Accordingly, apparatus 200 provides a cost efficient manner to verify that a subsystem (e.g., 104, 106, and 108) can detect, isolate, and handle the noise. In certain embodiments, subsystems 104, 106, 108 are computer workstations such as IBM X-Series, storage subsystems such as IBM's DS8000 disk storage subsystem, and enterprise-class processor subsystems such as IBM's Z-Series computers.

Figure 3:
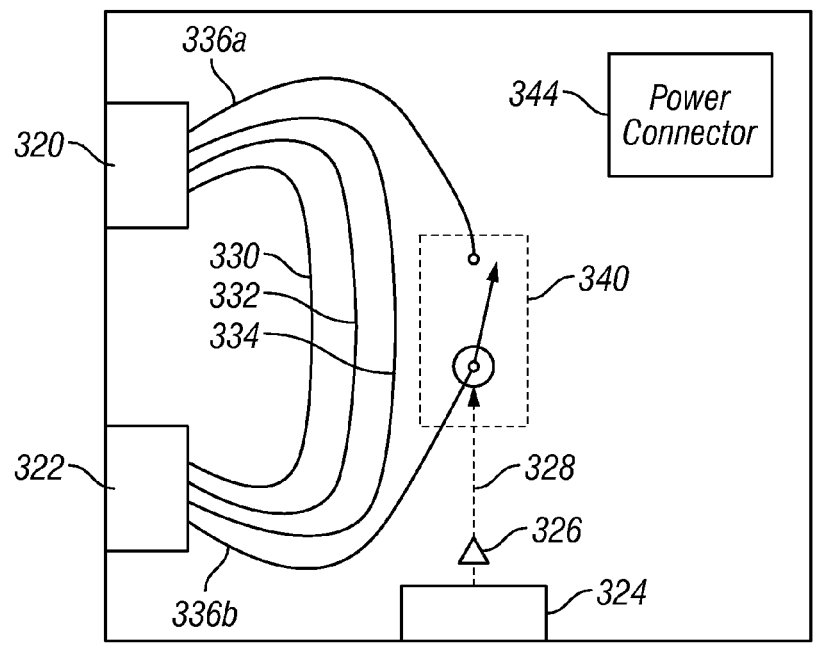
FIG. 3 is a schematic diagram illustrating an embodiment to inject noise in computerized network accordance with the present invention.

FIG. 3 illustrates an exemplary embodiment of apparatus 200 in accordance with the present invention. Apparatus 200 includes Ethernet noise injector card 220 configured to inject noise onto a communication or data link/cable, such as Ethernet cables 120a, 120b, 120c, 120d (FIGS. 1 and 2). In certain embodiments, the Ethernet noise injector 220 is coupled to a SAN system comprising at least one enterprises storage system ("ESS"), such as the TotalStorage® Enterprise Storage Server® from IBM®.

As illustrated in FIG. 3, the Ethernet noise injector 220 comprises a switch 340, at least two Ethernet connectors, ports, or jacks 320, 322, and a plurality of signal wires 330, 332, 334, and 336, which couple the switch 340 to Ethernet jacks 320, 322. In certain embodiments, the jacks 320, 322 comprise an RJ45 jack. In one embodiment, jacks 320, 322 are configured as RJ45 jack with a T-configuration.

The Ethernet noise injector 220 includes a parallel port or connector 324, such as a PC port or DB25 connector, coupled to switch 340 via buffer 326 and switch control signal wire 328. A switch control signal communicates (via switch control signal wire 328) to switch 340 to activate and deactivate switch 340. The activation and deactivation of switch 340, connects or disconnects wire 336a and 336b. For example, when switch 340 is in the "on" position, wire 336a is connected to wire 336b such that an electronic signal travels from jack 320 to jack 322. Similarly, when the switch is in the "off" position, wire 336a is disconnected from wire 336b such that there is no electronic signal traveling between jack 320 and jack 322. In certain embodiments, the switch 340 includes an analog switch. In other embodiments, the switch 340 includes a digital switch.

In certain embodiments, Ethernet noise injector 220 comprises a power connector 344 to supply electrical power to apparatus 200. The power connector 344 may include a 5 volt power connector. In certain embodiments, power is supplied to Ethernet noise injector 220 via Power over Ethernet (hereinafter PoE). In other embodiments, power is supplied to Ethernet noise injector 220 via an internal or external battery source. In certain embodiments, the power connector 344 is configured to plug into a power supply, such as an AC/DC adapter.

Figure 4:
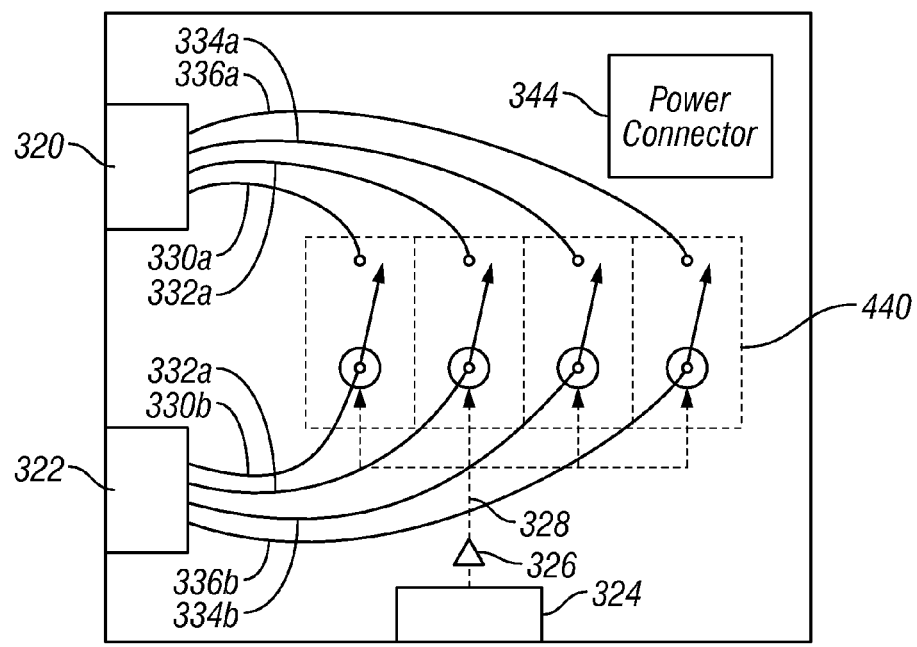
FIG. 4 is a schematic diagram illustrating an embodiment to inject noise in a computerized network in accordance with the present invention.

In certain embodiments, the Ethernet noise injector 220 is configured as a small electronic card with at least two Ethernet ports 320, 322 that link to the system Ethernet connection undergoing testing (e.g., see FIG. 2). To control the noise injection timing and duration, the PC parallel port 324 with a simple user application is used. For example, one side of the differential signal is electronically disconnected via analog switch 340, and the other three signals are left intact (see FIG. 3). This allows the receiving interface to see state transitions on the interface, so it does not perceive a disconnection, but the data stream is corrupted. To simulate a disconnection, all four signals are disconnected electronically (e.g., see. FIG. 4).

In certain embodiments, Ethernet injector card 220 may be included or embedded in a switch, hub, jack, or any other connection device capable of connecting to an Ethernet cable. For example, the Ethernet injector card 220 may be included or embedded as part of the Ethernet switch 110 such that network Ethernet traffic between the Ethernet switch 110 and computing device 108 travels through the Ethernet injector card 220. Similarly, Ethernet injector card 220 may be included as part of any one of the computing devices 104, 106, 108 such that network Ethernet traffic traveling between the Ethernet switch 110 and the computing devices 104, 106, 108 travels through the Ethernet injector card 220. In certain embodiments, computing devices 104, 106, 108 are storage subsystems, of a SAN network 100.

Referring again to FIG. 3, in operation, an Ethernet jumper cable, such as Ethernet cable 120c, is plugged into or connected to RJ45 jack 320. Ethernet signals TX+, TX− and RX+ are directly connected between RJ45 jack 320 and RJ45 jack 322, via wires 330, 332, and 334, respectively, so that they transmit these signals unaltered. Signal RX− from RJ45 jack 320 is connected to analog switch 340 via wire 336a, and the other side of analog switch 340 is connected to RJ45 jack 322 via wire 336b. The signal RX− is connected and disconnected via analog switch 340. Hence, signal RX− is controlled by engaging and disengaging analog switch 340.

The activation of analog switch 340 may be controlled by control signal 328. Control signal 328 is substantially buffered by buffer 326. The unbuffered control signal is generated by a parallel port, such as a PC parallel port, connected to a connector 324, such as a DB25 female connector. The connection and disconnection of signal RX− is thus controlled via the parallel port. In alternate embodiments, control signal 328 may be generated via other common computer interfaces, such as USB, RS-232, FireWire, etc. The RJ45 jack 322 is connected to a subsystem (e.g., storage subsystem 108) via cable, such as Ethernet jumper cable 120d, to complete the network 100. Power to analog switch 340 and buffer 326 may be provided externally from power connector 344. For example, an external 5V power supply 344 may provide power to analog switch 340. Alternatively, power to activate the analog switch 340 may be provide via Power over Ethernet (hereinafter "PoE").

In certain embodiments, the Ethernet noise injector 220 is configured to perform fault simulations on active systems. For example, Ethernet noise injector 220 performs fault simulations by simulating a marginal cable, a cable disconnection and/or re-cabling during operation of a system. Thus, the Ethernet noise injector 220 allows a cost-effective and economical diagnostic testing of an active and intact computing network system to verify performance parameters or to identify potential problem areas.

FIG. 4 illustrates another exemplary embodiment of apparatus 200 in accordance with the present invention. The exemplary apparatus 200 comprises an Ethernet noise injector card 420. In certain embodiments, the Ethernet noise injector 420 is configured as a link pull simulator.

The Ethernet noise injector 420 includes at least two jacks 320, 322, a plurality of switches 440, and a plurality of signal wires 330a, 332a, 334a, 336a connecting the jacks 320, 322 to the switches 440. In one embodiment, jacks 320, 322 include RJ45 jacks and signal wires include four signal wires TX+ 330a, TX− 332a, RX+ 334a, and RX− 336a.

The Ethernet noise injector 420 includes a parallel port or connector 324, such as a PC port or DB25 connector, coupled to switches 440 via buffer 326 and switch control signal wire 328. A switch control signal communicates (via switch control signal wire 328) to switches 440 to activate and deactivate switches 440. In certain embodiments, the switches 440 include analog switches. In other embodiments, the switches 440 include digital switches. In one embodiment, connector 324 is a DB25 female connector As illustrated in FIG. 4, switches 440 are configured as a bank of switches in which four signal wires TX+ 330a, TX− 332a, RX+ 334a, and RX− 336a connect one side of the bank of switches 440 to jack 320. Also, the four signal wires TX+ 330b, TX− 332b, RX+ 334b, and RX− 336b connect the other side of the bank of switches 440 to jack 322.

In certain embodiments, Ethernet noise injector 420 comprises a power connector 344 that supplies electrical power to apparatus 200. The power connector 344 may include a 5 volt power connector. In certain embodiments, power is supplied to Ethernet noise injector 420 via Power over Ethernet (hereinafter PoE). In other embodiments, power is supplied to Ethernet noise injector 420 via an internal or external battery source. In certain embodiments, the power connector 344 is configured to plug into a power supply, such as an AC/DC adapter.

In operation, an electrical or communication signal travels between jack 320 and jack 322 via the four signals TX+ 330, TX− 332, RX+ 334, and RX− 336. The signal traveling between jack 320 and jack 322 may be interrupted by activating and deactivating switches 440. For example, when switches 440 are in an "on" position, the signal travels between jacks 320, 322. When the switches 440 are in an "off" position, the signal between jacks 320, 322 is interrupted. Hence, there are no signals being transmitted through the bank of analog switches 440.

In one embodiment, when the switches 440 are in the "on" position, the Ethernet noise injector 420 appears as a straight cable between the switch 110 and the storage subsystem 108 (see e.g., FIG. 2). When the switches 440 are in the "off" position, because all four signals are disconnected substantially simultaneously, it appears to the storage subsystem 108 as though the connection has been lost via a cable pull. Thus, in one embodiment, the Ethernet noise injector 420 simulates a link pull.

In one embodiment, at least one of the switches 440 may be activated between the on/off positions by control signal 328. At least one of the signal wires 330, 332, 334, 336, may be interrupted via one of the switches 440. For example, switch control signal 328 may signal an "off" position to one of the switches 440 such that only wire 330a and wire 330b are disconnected. In another embodiment, switch control signal 328 may comprise multiple wires, each wire controlling a separate switch, such that any or all of multiple wires 330a and 330b, 332a and 332b, 334a and 334b, and 336a and 336b may be separately or collectively switched "on" and "off" to simulate different failure modes.

Figure 5:
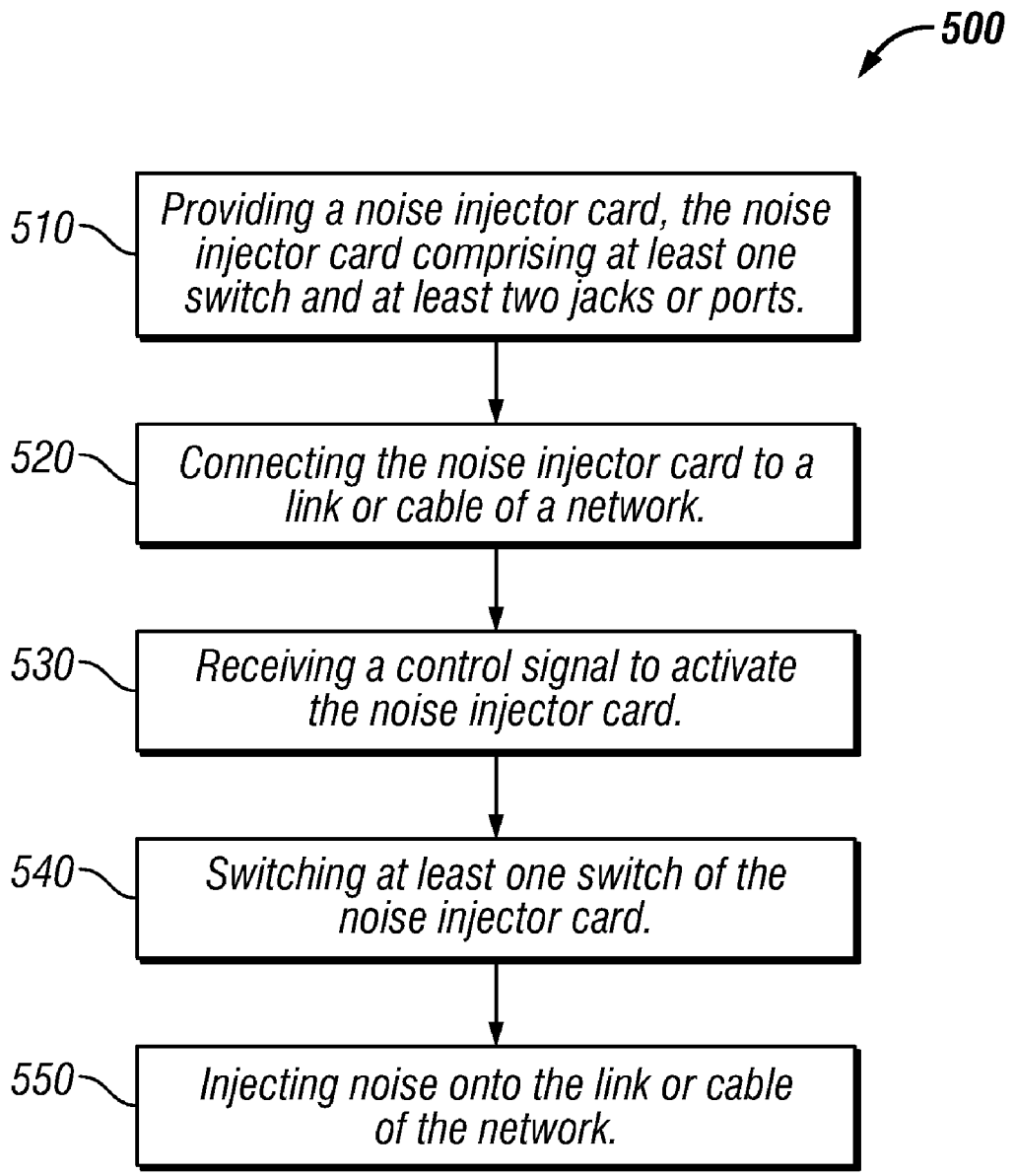
FIG. 5 is a schematic flow chart diagram illustrating a method to inject noise in a computerized network in accordance with the present invention.

FIG. 5 is a schematic flow chart diagram illustrating certain embodiments of a method 500 to inject noise in a system to simulate a marginal cable or cable pull. Method 500 may be implemented in a network system, such as system 100 in FIG. 2. In certain embodiments, method 500 may be implemented in an apparatus, such as apparatus 200 in FIGS. 3 and 4.

Referring to FIG. 5, method 500 provides 510 a noise injector card comprising at least one switch and at least two jacks or ports. In one embodiment, the noise injector card corresponds to apparatus 220 (FIG. 3). In another embodiment, the noise injector card corresponds to apparatus 420 (FIG. 4).

The noise injector card is connected 520 to a link or cable of a network. For example, the noise injector card is connected to Ethernet cables 120c and 120d as shown in FIG. 2. A control signal is received 530 to activate the noise injector card. For example, the control signal is received through a port, such as parallel port 324 (FIGS. 3 and 4). The control signal travels through buffer 326 along switch control signal wire 328 (e.g., FIGS. 3 and 4).

At least one switch of the noise injector card is switch 540 between "on/off" positions to disrupt at least one signal traveling on at least one electrical wire of the noise injector card. In certain embodiments, the switch corresponds to switch 340 where electrical wire 336a and 336b is connected and disconnected by switch 340 (e.g., see FIG. 3). In certain embodiments, the switch corresponds to switches 440 where at least one of the switches 440 is turned on or off to connect or disconnect an electrical signal traveling on at least one electrical wire 330, 332, 334, and 336 (e.g., see FIG. 4).

The noise injector card injects 550 noises onto a link or cable of a computerized network. For example, in one embodiment, method 500 electronically disconnects one side of the differential signal by switching an analog switch such that the other three signals are left intact (e.g., FIG. 3). Illustratively referring to FIG. 2, Ethernet traffic is sent from computer subsystem 108 to Ethernet switch 110 through Ethernet Noise Injector 220. When the Ethernet Noise Injector 220 is "off", Ethernet traffic travels through said injector from computer subsystem 108 to Ethernet switch 110 uninterrupted. When Ethernet Noise Injector 220 is "on", one wire 336a/336b is disrupted by Ethernet Noise Injector 220 and does not pass half of the differential Ethernet signal. Because Ethernet is a level-based technology, the fact that the other half of the differential signal carried by wire 334 is successfully transmitted from computer subsystem 108 to Ethernet switch 110 means that Ethernet switch 110 detects level transitions and does not perceive that the connection has been broken, but because the data transitions are incorrect due to the disconnected wires 336a and 336b, the data is corrupted. The injection of noise by method 500 allows computer subsystem 108 to resend the information that was interrupted previously by the Ethernet Noise Injector once the injector is turned "off", testing the network system's ability to recover from temporary interface errors.

In certain embodiments, method 500 injects 550 noises to simulate a disconnection or cable pull by electronically disconnecting all four signals. For example, as illustrated in FIG. 4, a bank of analog switches 440 are connected to four signal wires 330, 332, 334, and 336 such that any one of the signals or combinations thereof, are disconnected by switching the bank of switches 440.

Figure 6:
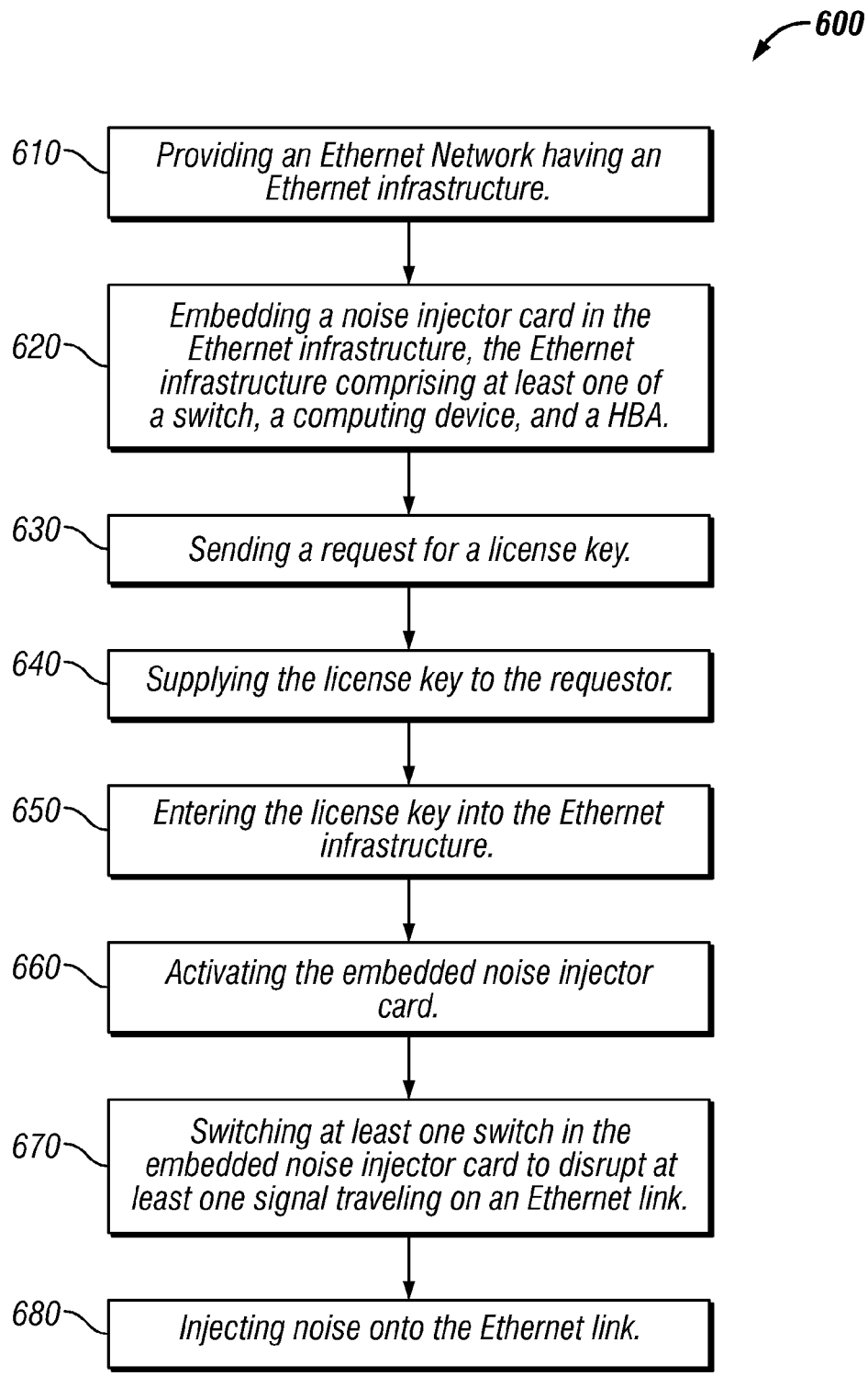
FIG. 6 is a schematic flow chart diagram illustrating a method to inject noise in a computerized network in accordance with the present invention.

FIG. 6 is a schematic flow chart diagram illustrating certain embodiments of a method 600 to deploy a system test for verifying the impact of having a marginal Ethernet cable or cable pull. Method 600 may be deployed in a network system, such as system 100 in FIG. 2. In certain embodiments, method 600 may be implemented in an apparatus, such as apparatus 200 in FIGS. 3 and 4.

Referring to FIG. 6, method 600 provides an Ethernet network having an Ethernet infrastructure. In one embodiment, the Ethernet network corresponds to network 100 (FIGS. 1 and 2). A noise injector card is embedded 610 in the Ethernet infrastructure. The Ethernet infrastructure includes at least one of a switch, a computing device, and a host bus adapter. For example, the noise injector card is embedded in an existing Ethernet infrastructure such as Ethernet host bus adapter (HBA), switches, hubs, or combinations thereof (FIGS. 1 and 2). In certain embodiments, the embedded noise injector card corresponds to noise injector card 220 or 420 (e.g., FIGS. 3 and 4).

In one embodiment, HBA represents an outgoing interface of a computing device 104, 106, 108 (e.g., FIGS. 1 and 2). The switches and/or hubs 110, 120 are used to interconnect the computing devices 104, 106, 108 among each other and endpoint devices 150, such as storage systems (FIGS. 1 and 2).

In one embodiment, the HBA is connected to a storage system directly without a switch or hub. In this embodiment, the storage system includes the HBA, which is used to connect the storage system to other storage systems directly or via hubs and switches. For example, computing device 108 may comprise a storage system comprising a HBA, which connects device 108 to Ethernet jumper cable 120c (FIG. 1). In this configuration, because the noise injector card is embedded in the HBA there is no need to connect apparatus 200 with Ethernet jumper cable 120c and 120d, as shown in FIG. 2.

A request is sent 630 for a license key to activate the embedded noise injector card. For example, a requester, such as a customer or user, sends 630 a request to a supplier, such as IBM. The supplier supplies 640 the license key to the requester. The license key is entered 650 into the Ethernet infrastructure.

Once the license key is entered, the embedded noise injector card is activated 620. At least one switch of the embedded noise injector card is switch 670 to connect or disconnect one or more electrical wires/lines. The electrical wires/lines carry an electrical signal (e.g., FIGS. 3 and 4). In certain embodiments, the electronic signal may be communicating data and information to be stored and retrieved from storage subsystems 104, 106, 108 in the Ethernet network 100 (FIGS. 1 and 2). In certain embodiments, storage subsystems 104, 106, 108 comprise ESS.

In certain embodiments, the activation of the noise injector card may be done externally or by management software. For example, control software (which exists on one of the computer systems present on the Ethernet interface) may loop through a continuous sequence of writing a register that activates the control signal, waiting a predetermined time, then again writing said register with a different value that deactivates the control signal. Alternatively, the computer system may send a special Ethernet packet to the embedded Ethernet Noise Injector card that activates or deactivates the switches.

In certain embodiments, the activation of the embedded noise injector card is done via the license key. For example, a customer or user may obtain a license key from a supplier or vendor. In one embodiment, IBM supplies the license key to activate the embedded noise injector card. The user enters the license key into the Ethernet infrastructure being tested. Once the license key is entered, the embedded noise injector card is activated. The license key may be entered in accordance with standard methods, such as management and configuration interfaces. For instance, the configuration software (which may be use to set up Ethernet switches in the network as known in the art) may also be used to configure and run the Ethernet Error Injector when an optional license code is entered.

As described, in certain embodiments, method 500 or 600 maybe deployed as part of a complete system test of IBM storage systems or products to verify the system impact of having a marginal Ethernet cable in our storage systems. By deploying method 500 or 600, the noise injector card (e.g., apparatus 200; FIGS. 3 and 4) injects noise into a link/cable such that the system is still intact; i.e., the cable is not pulled, but the information stream is disrupted. The injection of noise into the cable simulates the pulling of the cable to verify that the system can handle inadvertent and intentional re-cabling while the system is active. In certain embodiments, methods 500 and 600 provides a reliable, cost effective manner to perform fault simulations and determine which Ethernet devices (e.g., 104, 106, and 108) are not performing properly while the system 100 is active and intact.

As FIGS. 1-6 illustrate, the present invention provides a method and apparatus to inject Ethernet noise into a computerized network system, such as IBM X-Series, P-Series, Z-Series, and I-Series computer systems. Also, as depicted in FIGS. 1-6, embodiments of the present invention facilitate simulating a faulty and/or marginal cable in an Ethernet based network while the system, such as a storage system, is intact and active.

For example, certain embodiments of the present invention are configured to inject noise onto one of the interface cables that connects at least two subsystem within the storage system (see e.g., FIGS. 1-6). This allows one to verify that the subsystem can detect, isolate, and handle the noising be injected by the present invention.

What is claimed is:

1. An apparatus to inject noise onto a cable of a network, the apparatus comprising:
   at least two jacks;
   a plurality of signal wires connecting the two jacks together;
   a switch connected to the two jacks by at least one of the plurality of signal wires;
   a parallel port connected to the switch via a control signal wire; and
   a power connector connected to the switch, wherein a control signal activates the switch, and the timing and duration of the control signal is controlled to electronically disconnect a differential signal in the signal wires via an analog switch.

2. The apparatus of claim 1, further comprising a buffer to buffer a control signal of the control signal wire.

3. The apparatus of claim 1, wherein the plurality of wires comprises a first signal wire RX+, a second signal wire RX−, a third signal wire TX+, and a fourth signal wire TX−.

4. The apparatus of claim 3, wherein the second signal wire RX− is connected to the switch.

5. The apparatus of claim 1, wherein the two jacks comprise a RJ45 jack.

6. The apparatus of claim 1, wherein the switch comprises an analog switch.

7. The apparatus of claim 1, wherein the switch comprises a digital switch.

8. The apparatus of claim 1, wherein power is supplied to the apparatus via Power over Ethernet.

9. The apparatus of claim 1, wherein the parallel port comprises a DB25 connector.

10. An apparatus to inject noise onto a cable of a network, the apparatus comprising:
   at least two ports;
   a plurality of signal wires connecting the two ports together; and
   a plurality of switches connected to the two ports by the plurality of signal wires, wherein a control signal activates one of the switches to inject noise in the network, and the timing and duration of the control signal is controlled to electronically disconnect a differential signal in the signal wires via an analog switch.

11. The apparatus of claim 10, further comprising a parallel port connected to the switch via a control signal wire.

12. The apparatus of claim 11, further comprising a buffer to buffer a control signal of the control signal wire.

13. The apparatus of claim 10, further comprising a power connector connected to the switch.

14. The apparatus of claim 10, wherein the plurality of wires comprises a first signal wire RX+, a second signal wire RX−, a third signal wire TX+, and a fourth signal wire TX−.

15. A method to inject noise onto a communication link of a network, the method comprising:
   providing a noise injector card;
   connecting the noise injector card to a link of a network;
   receiving a control signal to activate the noise injector card;
   injecting noise onto the link of the network; and
   controlling the timing and duration of the control signal to electronically disconnect a differential signal in the communication link via an analog switch.

16. The method of claim 15, further comprising switching at least one switch of the noise injector card.

17. The method of claim 15, further comprising supplying power to the noise injector card.

18. A method to inject noise in a network, the method comprising:
   proving an Ethernet network having an Ethernet infrastructure;
   embedding a noise injector card in the Ethernet infrastructure;
   entering a license key into the Ethernet infrastructure;
   activating the embedded noise injector card with a control signal, wherein the timing and duration of the control signal is controlled to electronically disconnect a differential signal in the network via an analog switch; and
   injecting noise onto the Ethernet infrastructure.

19. A method of claim 18, further comprising sending a request for the license key.

20. The method of claim 19, further comprising supplying the license key to a requestor.

21. The method of claim 20, further comprising entering the license key into the Ethernet infrastructure.

22. The method of claim 18, further comprising switching at least one switch in the embedded noise injector card to disrupt at least one signal traveling on an Ethernet link.

* * * * *